(12) United States Patent
Beekman et al.

(10) Patent No.: US 11,481,515 B2
(45) Date of Patent: Oct. 25, 2022

(54) CONFIDENTIAL COMPUTING WORKFLOWS

(71) Applicant: Fortanix, Inc., Mountain View, CA (US)

(72) Inventors: Jethro Gideon Beekman, Eindhoven (NL); Savvas Savvides, San Jose, CA (US); Richard Searle, Thame (GB); Ambuj Kumar, Sunnyvale, CA (US)

(73) Assignee: Fortanix, Inc., Mountain View, CA (US)

( * ) Notice: Subject to any disclaimer, the term of this patent is extended or adjusted under 35 U.S.C. 154(b) by 0 days.

(21) Appl. No.: 17/189,075

(22) Filed: Mar. 1, 2021

(65) Prior Publication Data

US 2022/0277107 A1 Sep. 1, 2022

(51) Int. Cl.
*G06F 21/62* (2013.01)
(52) U.S. Cl.
CPC ........ *G06F 21/6281* (2013.01); *G06F 21/629* (2013.01); *G06F 2221/2141* (2013.01)
(58) Field of Classification Search
CPC .............. G06F 21/6281; G06F 21/629; G06F 2221/2141
USPC .......................................................... 726/1
See application file for complete search history.

(56) References Cited

U.S. PATENT DOCUMENTS

2004/0025048 A1\* 2/2004 Porcari .................. G06Q 50/18
705/310
2005/0165734 A1\* 7/2005 Vicars ..................... G06F 16/93
2009/0037225 A1\* 2/2009 Burchianti, II ........ G16H 40/20
705/7.18

(Continued)

FOREIGN PATENT DOCUMENTS

EP          2287775 A1 \*  2/2011  ........... G06F 21/604
JP       2007164460 A   \*  6/2007

(Continued)

OTHER PUBLICATIONS

Guo et al., "Trusted Platform Based Linux File Access Control," IEEE, 2015, pp. 1389-1394, doi: 10.1109/CIT/IUCC/DASC/PICOM.2015.207. (Year: 2015).\*

(Continued)

*Primary Examiner* — Peter C Shaw
(74) *Attorney, Agent, or Firm* — Lowenstein Sandler LLP

(57) ABSTRACT

A method may include obtaining, by a processing device, a workflow object that includes a plurality of workflow entity objects and one or more data objects, and executing a workflow by identifying, from the application objects, an application object that corresponds to a first application, wherein the workflow associates the application with at least one of the data objects, determining, whether the first application has permission to access the data object according to a data policy associated with the data object, wherein the data policy specifies one or more data access criteria, wherein the first application has permission to access the data object in response to one or more of the workflow entity objects that are associated with the data object satisfying the data access criteria, and responsive to determining that the first application has permission to access the data object, executing the first application in a secure enclave.

19 Claims, 9 Drawing Sheets

(56) References Cited

U.S. PATENT DOCUMENTS

| | | | |
|---|---|---|---|
| 2011/0321131 A1* | 12/2011 | Austel | G06F 21/33 |
| | | | 726/4 |
| 2014/0201331 A1* | 7/2014 | Kershaw | G06F 16/9027 |
| | | | 709/219 |
| 2015/0281287 A1* | 10/2015 | Gill | G06F 21/577 |
| | | | 726/1 |
| 2016/0179594 A1* | 6/2016 | Buth | G06F 9/541 |
| | | | 719/313 |
| 2018/0157433 A1* | 6/2018 | Sajja | G06F 3/0622 |
| 2019/0213104 A1* | 7/2019 | Qadri | G06F 21/12 |
| 2020/0111080 A1* | 4/2020 | Metcalfe | G06Q 20/3825 |
| 2021/0026991 A1* | 1/2021 | Ossig | G06F 21/606 |
| 2021/0232991 A1* | 7/2021 | Gupta | G06Q 10/0633 |

FOREIGN PATENT DOCUMENTS

| | | | | |
|---|---|---|---|---|
| WO | WO-2015089171 A1 * | 6/2015 | | G06F 21/10 |
| WO | WO-2016089567 A1 * | 6/2016 | | |
| WO | WO-2019215647 A1 * | 11/2019 | | G06F 21/552 |

OTHER PUBLICATIONS

Mofrad et al., "Securing Big Data Scientific Workflows via Trusted Heterogeneous Environments," in IEEE Transactions on Dependable and Secure Computing, doi: 10.1109/TDSC.2021.3123640. (Year: 2021).*

Rathnayake et al., D. Meedeniya and I. Perera, "A Realtime Monitoring Platform for Workflow Subroutines," 2018 18th International Conference on Advances in ICT for Emerging Regions (ICTer), 2018, pp. 41-47, doi: 10.1109/ICTER.2018.8615557. (Year: 2018).*

Long et al., "A prototype secure workflow server," Proceedings 15th Annual Computer Security Applications Conference (ACSAC'99), 1999, pp. 129-133, doi: 10.1109/CSAC.1999.816020. (Year: 1999).*

Li et al., "Security considerations for workflow systems," NOMS 2000. 2000 IEEE/IFIP Network Operations and Management Symposium 'The Networked Planet: Management Beyond 2000' (Cat. No. 00CB37074), 2000, pp. 655-668, doi: 10.1109/NOMS.2000.830420. (Year: 2000).*

* cited by examiner

CONFIDENTIAL COMPUTING WORKFLOWS

TECHNICAL FIELD

Aspects of the present disclosure relate generally to security, and more specifically, relate to workflow processing in confidential computing environments.

BACKGROUND

A workflow may be a defined sequence of tasks that processes input data and generates output data. A workflow management system (WMS) may provide features for creating workflows by enabling a user to define the sequence of tasks to be performed by a workflow. Each task may perform operations such as processing data, sending or receiving data via a network, storing data in a data store, interacting with users, or the like. The WMS may present a graphical representation of a workflow in a user interface, and may perform the workflow by executing the workflow's tasks in the defined sequence.

An application may perform operations on data. For example, the application may access or read data from a file system when the application is executing. The application may utilize a cryptographic operation to be performed on data to protect the data from unauthorized access. For example, the data may be encrypted data that is to be decrypted or the data may be signed by a digital signature that is to be verified. In general, the cryptographic operation may be based on the use of a cryptographic key. For example, a private key may be used to decrypt data that has been encrypted (e.g., ciphertext) or to provide a digital signature for use to authenticate the identity of a sender of a digital message. The application may be executed in a data center.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
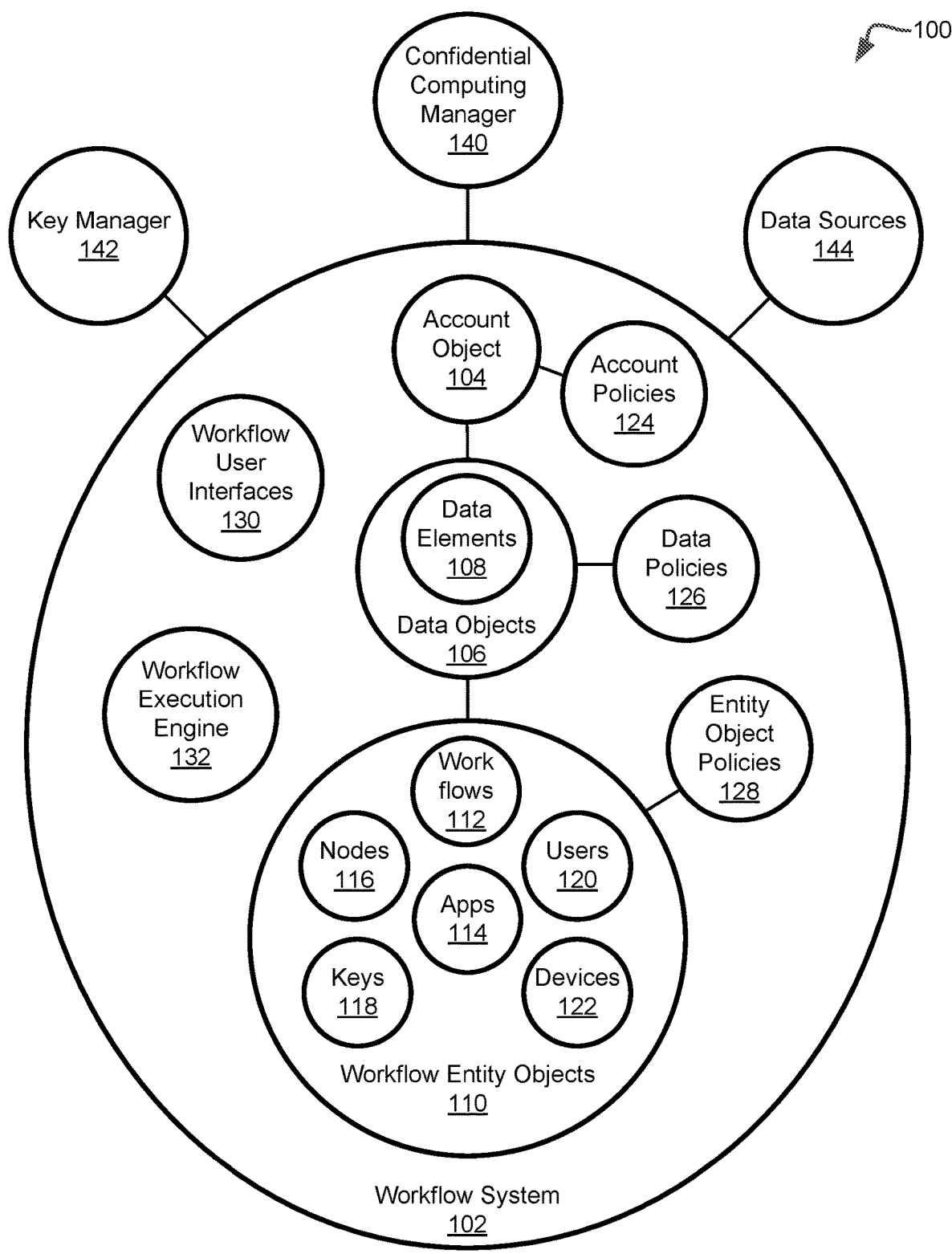
FIG. 1 illustrates an example environment to provide confidential computing workflows in accordance with particular embodiments of the present disclosure.

Aspects of the present disclosure relate to a workflow system that can be used to create and execute workflows that perform secure data processing operations in a computing environment. A workflow can integrate various entities together, including data, data center accounts in which data is hosted, applications that include instructions for processing the data, compute nodes that execute the applications, cryptographic keys that can enable access to secure data, and users or devices that are authorized to access data hosted in accounts. The entities can be associated with corresponding policies, which can specify conditions that control use of the entities.

In the workflow system, a workflow can be represented as a set of workflow entity objects that represent the workflow entities. The entity objects can include data objects, which can represent secure data, and application objects, which can represent applications that perform tasks in the workflow. Each application can perform operations on data objects and generate other data objects. A workflow can specify particular applications to execute in a particular sequence, as well as input data object(s), output data object(s) for each application, and connections between applications.

Each application can be implemented as, for example, computer program code that executes on compute nodes of the computing environment to perform the application's operations. The computing environment can include a confidential computing manager (CCM). When a workflow is run, the workflow system can execute the applications in the workflow using secure computation techniques and access the data objects using security credentials obtained from the CCM. The secure computation techniques, such as secure enclaves, can protect against unauthorized access or changes to application program code and data. Thus, secure computations can be implemented as a workflow invoking applications that perform operations on secure data.

In addition to data objects, a workflow can be associated with entity objects that represent entities in or related to the workflow. The entity objects can include the application objects described above, as well as node objects representing compute nodes on which workflows can be executed, key objects representing cryptographic keys or certificates, user objects representing individual (human) users who access data, or workflow objects representing workflows.

Each of the data objects and entity objects in a workflow can be associated with a policy, which can specify usage conditions, such as how, where, when, and by whom the associated object can be used. A data object can be associated with a data policy that controls specified aspects of the use of the data object, such as whether a particular application or user is permitted to access a data object. As an example, a provider of a data object can define a data policy that specifies one or more particular usage conditions, and associate the data policy with a data object to impose the particular usage conditions on applications and other workflow objects that attempt to use the data object. The workflow system prevents use of a data object if the data policy associated with the data object is not satisfied.

A data policy can specify compute nodes, users, and devices that are authorized to use an associated data object. The data policy can also specify a cryptographic policy, in which case use of the associated data object can require a specified encryption key type, length, and/or encryption keys. The data policy can also specify access permissions such as read access or write access that can prevent workflows from performing read or write operations on the data associated with the data policy. Further, the data policy can specify times during which the associated data can be accessed.

Entity objects, including application objects, node objects, key objects, user objects, and workflow objects, can be associated with corresponding types of entity policies that can control specified aspects of the use of the entity objects. For example, an application policy can specify which data objects an application is permitted to access, and on which node object the application is permitted to be deployed for execution. The workflow system can enforce policies by preventing operations on objects, such as accessing data or deploying an application, that violate a policy associated with the object.

The workflow system can include user interfaces that enable users to design workflows using graphical representations of the workflows, which can include graphical representations of objects, such as applications and data, and relationships between objects, such as connections between an input data object and an application. The user interfaces can include a workflow composition user interface, which can generate a workflow object based on a graphical representation of the workflow object composed by a user. The composition user interfaces can also enable users to associate policies with objects. A workflow approval user interface can present a workflow, e.g., a graphical representation of the workflow object, to one or more users for approval. If a sufficient number of users approve the workflow, it can be made available for execution. The workflow system can enforce policies at design time, approval time, and/or execution time of the workflow.

The workflow system can execute an application on a processing device, such as a compute node, by obtaining a workflow object that specifies one or more application objects to be executed and one or more data objects to be processed by the application objects. The workflow system can cause the program code of applications represented by each of the application object to execute within a secure enclave associated with a processing device such as a compute node. The workflow system can obtain an application configuration associated with the application object. The application configuration can include data access information for the one or more data objects. The workflow system can determine, for each of the data objects, whether the application object and the user executing the workflow have permission to access the data objects according to a data policy associated with the data object. Responsive to determining, for each of the data objects, that the application object and the user have permission to access the data object according to the data policy, the workflow system can obtain access credentials for the data object using the data access information specified in the application configuration for the data object. The workflow system can then execute the application program code in the secure enclave, and the application program code can access the data objects using the access credentials.

Advantages of the present disclosure include, but are not limited to, the ability to compose workflows that perform tasks using secure applications and data without the need to write program code to perform the tasks and access the secure data. This ability may be useful, for example, because composing workflows can be done more quickly and efficiently than writing program code. Further, according to the present disclosure, data can be associated with data use policies by a provider of the data, and workflow system enforces the data use policies, so that applications access the data according to the data use policies. Thus, the person or organization who provides the data can control how the data will be used, including who can access the data, and where and when the data can be accessed. Policies can also be used to control use of other workflow entities, such as applications, cryptographic keys, and compute nodes.

FIG. 1 illustrates an example environment 100 to provide confidential computing workflows in accordance with particular embodiments of the present disclosure. The environment 100 may correspond to network servers that provide a workflow system 102 that includes user interfaces for creating and managing workflows and execution engines for executing workflows. The network servers may also provide a confidential computing manager (CCM) 140 that can provide services related to security of applications and data, a key manager 142 that can provide secure storage of cryptographic keys, and one or more data sources 144 that can provide secure storage of data. Other data sources, referred to herein as external data sources, e.g., data sources external to the account represented by the account object 104, can also provide secure data storage. The external data sources can be hosted outside the environment 100 and can provide data to and receive data from network servers of the environment 100 via network communication or other form of communication.

As shown in FIG. 1, the environment 100 may correspond to a network cluster or a data center. For example, a first network server may provide workflow system 102 and key manager 142, a second network server may provide CCM 140, and a third network server may provide data sources 144. In some embodiments, a same network server may provide the workflow system 102, the CCM 140, the workflow system, the key manager 142, and the data sources 144. In some embodiments, the second network server that is providing the CCM 140 and/or the third network server that is providing the data sources 144 may be external from a data center that includes the first network server that provides the workflow system 102. In some embodiments, the workflow system 102 may be provided by a plurality of network servers.

As shown in FIG. 1, a network connection may couple the workflow system 102 with the confidential computing manager 140, the key manager 142, and/or the data sources 144. Furthermore, the workflow system 102 may be a software or hardware resource that provides for creation, management, and execution of workflows that execute secure applications and access secure data objects, as described in further detail below. The workflow system 102 may use a data model that includes one or more account objects 104, one or more data objects 106, and one or more workflow entity objects 110. Each account object 104 can be associated with a set of data objects 106, which represent data. A workflow can involve processing data objects 106, e.g., by receiving input data objects, invoking one or more application objects 114 that perform operations using the input data objects and other information, such as configuration information, and generating output data objects. Workflow entity objects 110 can represent entities of various types in workflows. The workflow entity objects 110 can include one or more workflow objects 112, application objects 114, node objects 116, cryptographic key objects 118, user objects 120, or device objects 122, which are described below.

Each account object 104 may represent an account, which may be a logical grouping that represents an entity or organization that uses the workflow system 102. An account may correspond to a data center account or the like. For example, an account may correspond to physical nodes from one or more data centers. In a multi-tenant system, computational resources such as storage and processors may be partitioned among different accounts, so that storage and processors used by one account are cryptographically isolated from those used by other accounts. Within an account, data objects 106 associated with the account are available to users or devices that have access to the account. Users or devices can obtain access to an account by authentication or otherwise presenting valid credentials for the account. Each account object 104 can correspond to an account in the CCM 140.

One or more data objects 106 may represent data or a data source from which data can be accessed. Each data object 106 may include one or more data elements 108. A data source can correspond to or provide a data element 108. A data source may be, for example, a file on a local or remote disk, a database, a cloud database record, an Application Programming Interface (API) from which data may be retrieved, a data stream, and so on. Data represented by a data object 106 can be of any suitable format, e.g., structured according to a schema or other data format (e.g., comma-separated values), unstructured bytes sequences, program code, encrypted data, and so on. A workflow can receive a data object 106 as input data. A data object 106 can also be the output of a workflow.

As set forth above, a workflow object 112 can represent a workflow. The term "workflow" herein shall refer to a workflow object 112 or a combination of a workflow object 112, one or more data objects 106, and one or more associated workflow entity objects 110. A workflow object 112 can be associated with or include one or more workflow entity objects 110 that represent entities included in or related to the workflow object 112. Each of the workflow entity objects 110 can be bound to (e.g., associated with) at least one data object 106. This binding can enable the workflow entity objects 110 to be used by authorized users represented by user objects 120 (and authorized devices represented by device objects 122) to process the associated bound data objects 106. Thus, an entity object 110 can be associated with an account via binding between the entity object and a data object, and the association between the data object and the account. If a data object 106 comprises multiple data sources, the workflow entity objects 110 bound to the data object 106 can be bound to each of the data sources.

Application objects 114 can represent applications that can be executed by the workflow, and node objects 116 can represent compute nodes, network servers, or other processing devices on which the workflow can execute. The workflow entity objects 110 can also include one or more cryptographic key objects 118, which can represent cryptographic keys, one or more user objects 120, which can represent individual (human) users, and one or more device objects 122, which are similar to the user objects 120 but can represent machines instead of humans.

A workflow object 112 can represent a workflow. The workflow object 112 can include or be associated with data objects 106 that represent data processed by the workflow and one or more other workflow entity objects 110. The workflow entity objects 110 can represent entities in or related to the workflow, such as applications 114 that represent applications executed by the workflow, nodes 116 that represent compute nodes or other processing devices on which the workflow can execute, cryptographic keys 118, users 120, and devices 122. A workflow object 112 (including the data objects 106 and entity objects 110 in or associated with the workflow object 112) can be persisted for re-use and can be executed on compute nodes represented by node objects associated with the Workflow. Execution of workflows can be initiated or otherwise controlled by a graphical user interface for or Representational State Transfer (REST) API. If multiple node objects 116 are authorized to execute a workflow object 112, node provisioning can be automated, with automatic optimization of compute resource utilization.

A workflow that is being executed or has been executed may be referred to herein as a "workflow instance" and may include or be associated with additional information, such as particular values of data objects 106. A workflow object 112 can include other workflow objects 112, e.g., to represent workflows that contain or invoke other workflows. An application object 114 can represent an application that can be invoked by the workflow. The application represented by an application object 114 can include program code implemented in a programming language such as PYTHON, JAVA, C, C++, GOLANG, RUST, SCALA, and so on. The application object 114 can be invoked at a particular point in the workflow to cause execution of the corresponding application. For example, an application object 114 can be invoked subsequent to other application objects that precede the application object 114 in the workflow according to the workflow's connections between application objects, or prior to other application objects that succeed the application object 114 in the workflow. An application object 114 can be connected to other application objects 114 in a workflow to form sequences of applications that represent sequences of tasks. Application objects 114 can perform operations on data. Each application object in a workflow can receive one or more input data objects and generated one or more output data objects. Applications can thus be connected to form sequences in which the output data objects produced by an application can be provided to other application as input data objects. Applications can be implemented using native program code that can execute using secure computation techniques such as secure enclaves. Applications program code, which can be in the form of a container (e.g., a DOCKER container, or the like), can be automatically converted to be deployed in secure enclaves.

A node object 116 can represent a compute node or other processing device on which a workflow object 112 can be executed by the workflow system 102. Node objects 116 can represent individual computing resources such as bare metal servers or virtual machines of the computing infrastructure available for processing data hosted by the account. The computing environment 100 can include cloud resources and/or on-premises resources with the ability to process data objects with transparent deployment of application (e.g., without refactoring, recompiling, or modifying of containers).

A cryptographic key object 118 can represent a cryptographic key, certificate, or other secrets used for encryption/decryption and at-rest security of data objects 106. The key objects 118 can be stored in a self-encrypting key management service, which can provide key management services to the CCM 140 and the workflow system 102. For example, a self-encrypting key management service can be integrated as a key management provider for the CCM 140. Key objects 118 can also reference runtime encryption plugins that provide encryption services. More information on self-encrypting key management services may be found in U.S.

Pat. No. 10,609,006, filed 13 Jan. 2017, and U.S. Pat. No. 10,911,538, filed 11 Apr. 2017, each of which is incorporated by reference.

A user object 120 can represent a user, such as a human user, who can be authorized to use (e.g., access) data objects 106 hosted within an associated account associated with an account object 104. Similarly, a device object 122 can represent a user, such as a machine (non-human) user that is authorized to use the data objects 106. Device objects 106 can represent devices from an external system, such as Internet of Things (IoT) edge devices with integrated confidential computing capability, for example. Each device object 106 can represent a REST API for authentication to the CCM 140 by the external system and execution of requests for remote processing of data objects 106 using application objects 114 and/or workflow objects 112. Although particular objects 104, 106, 110 are described herein, the workflow system 102 may include any suitable objects, such as objects that represent any entities presented by workflow user interfaces 130 or processed by workflow execution engine 132.

A workflow can be created, modified, deleted, or managed by one or more workflow user interfaces 130. The workflow user interfaces 130 can include a workflow composer user interface (UI) that can be used to graphically create and modify workflows represented graphically. For example, the workflow composer UI can present a workflow as an interactive diagram depicting the data objects 106 and one or more of the entity objects 110 of the workflow, such as applications 114 and associated nodes 116, as well as connections between data objects and entity objects, connections between entity objects. The UI workflow diagram can display lines representing connections between workflow objects. A connection can represent flow of data between data objects and application objects, or connections representing flow of control between application objects, for example.

A workflow represented by a workflow object 112 can be executed by a workflow execution engine 132 to perform the operations specified by the workflow object, thereby generating a workflow instance based on the workflow object 112. Executing a workflow object 112 may involve performing operations corresponding to each data object 106 and workflow entity object 110 (e.g., application object 114) in the workflow object 112. The operations, such as program code instructions of an application that corresponds to an application object 114, may be performed on one or more compute nodes associated with the account object 104. The compute nodes may correspond to the node objects 116 associated with the workflow object 112. For example, the compute nodes on which each an application represented by an application object 114 of a workflow object 112 is executed may be specified by a node object 116 associated with the application object 114.

Each of the objects 104, 106, 110 can be associated with a policy that specifies how the associated object can be accessed, executed, or otherwise used. The policies can include account policies 124, data policies 126, and entity object policies 128 that correspond to the account objects 104, data objects 106, and workflow entity objects 110, respectively. Each of the policies 124, 126, 128 may specify one or more conditions or other instructions that control use of an associated object of a corresponding type (account, data, or entity) from the objects 104, 106, 110, respectively.

Each policy 124, 126, 128 may specify one or more conditions or other instructions that can determine whether to permit use of an associated object 104, 106, 110 or specify how an associated object 104, 106, 110 is permitted to be used. Each type of entity object may be associated with a corresponding type of entity object security policy. Thus, each workflow object 112 may be associated with a workflow policy, each application object 114 may be associated with an application policy, each node object 116 may be associated with a node policy, each cryptographic key object 118 may be associated with a cryptographic key policy, each user 120 may be associated with a user policy, and each device object 122 may be associated with a device policy.

Each account policy 124 may specify one or more conditions (or other instructions) related to the use of one or more associated account objects 104. Each account object 104 can correspond to an account of the CCM 140. An account policy 124 can specify that quorum approval is a condition for performing activities such as policy revision, cryptographic key lifecycle operations, and the like. An account policy can include cryptographic policies to be applied to keys used to protect data objects (e.g., at minimum, AES 256-bit keys, and so on), infrastructure policies used to manage node objects 116 and maintain regulatory and information risk management (IRM) compliance, such as mapping of source data country of origin to regional node clusters; restriction of selected data objects 106 to a specific cloud provider or confidential computing platform (e.g., secure enclave, fully homomorphic encryption, or the like), generation of user alerts based on node resource consumption, and so on).

Each data policy 126 may specify one or more conditions (or other instructions) for the use of one or more associated data objects 106. A data policy 126 can include one or more cryptographic policies that can specify cryptography-related properties that can be enforced by the workflow system 102 as conditions for using for the associated data objects 106, such as a cryptographic key type, length, encryption keys to be used for encrypting the data represented by the associated data objects 106. A data policy 126 can also specify authorized node objects 116, application objects 114, user objects 120, and/or device objects 122 that are permitted to use the associated data objects 106. A data policy can further specify a quorum policy, in which case use of the associated data object 106 requires approval from at least a threshold number of approving entities (e.g., users or applications) from a specified group. A data policy 126 can be subordinate to (e.g., have lower precedence than) the associated account policy 124, so that conflicts between a first condition associated with the data policy 126 and second condition associated with the account policy 124 are resolved by using the second associated with the account policy 124. Further, an entity object policy 128 can be subordinate to an associated data policy 126, so that conflicts between a first condition associated with the entity object policy 128 and second condition associated with the entity object policy 128 are resolved by using the second associated with the data policy 126.

An application object 114 or other workflow entity object 110 that attempts to use a data object 106 without satisfying the conditions of the associated data policy 126 can be prevented from using the data object 106 by the workflow system 102. Policies 124, 126, 128 can be enforced at design time, approval time, and/or runtime. As an example, a "Read-Only" Policy can be set for a data object 106 to indicate that the data object is input data. The read-only policy can be enforced at design time in a workflow composition user interface by preventing users from constructing workflows having a "write" output from an application that points to the data object. The read-only policy can alternatively or additionally be enforced at approval time, e.g., by preventing approval of workflows having a write output that points to the data object. Further, the read-only policy can alternatively or additionally be enforced at runtime, e.g., by preventing execution of workflows having a write output that points to the data object.

Each entity object policy 128 may specify one or more conditions (or other instructions) for the use of one or more associated workflow entity objects 110. The entity object policies 128 may include workflow policies, application policies, node policies, cryptographic key policies, user policies, and device policies.

A workflow policy may specify conditions for the use of one or more associated workflow objects 112. A particular workflow object 112 can be subject to the entity policies 128 of the entity objects 110 in or associated with the workflow object 112 (including workflow policies of other workflow objects 112 that represent workflows nested inside the particular workflow object 112). Workflow policies can also control the deployment of associated workflow objects 112, e.g., by specifying an expiry date beyond which the workflow object 112 cannot be executed, a failover/retry procedure for the workflow object 112 to be used if there is a node or application failure that affects the workflow object 112, and so on. A quorum approval policy can also be specified for a workflow policy so that requests to execute the workflow are approved conditionally, upon receiving quorum approval from a set of authorized users of a workflow object 112.

An application policy may specify which data objects 106 can be accessed by an application object 114 and/or on which node objects 116 the application object 114 is permitted to be deployed. An application policy may also specify performance parameters for the application object 114, e.g., enclave memory size, a base container type to be used for automated conversion of non-containerized application objects 114, and so on. For example, an application policy can specify cryptographic policy elements that can apply to applications, such as an encryption key type and length to be used by the application.

A node policy may specify conditions for the use of one or more associated node objects 116. Node Policies can support management of resource consumption, e.g., by specifying a maximum resource utilization condition, and compliance with regulatory and Information Rights Management (IRM) requirements configured at the account policy 124 level.

A cryptographic key policy may specify conditions for the use of one or more associated cryptographic key objects 118. Permission to use keys (and key-related plugins) can be controlled by a cryptographic policy that restricts the key type and/or size.

A user policy may specify conditions to be satisfied by one or more associated user objects 120. Role-based access control enforcement can be performed when user policies are accessed. A user policy can define what permissions the associated user has to configure and/or execute application objects 114 and workflow objects 112, and manage key objects 116 (and key related plugins) that are associated with a data object 106. A device policy may specify conditions for use by one or more associated device similarly to a user policy as described above. Although particular policies 124, 126, 128 are described herein, the workflow system 102 may include any suitable policies, such as policies for any objects that represent entities presented by workflow user interfaces 130 or processed by workflow execution engine 132.

There may be a precedence relation among policies, so that policies of one type take precedence over policies of another type. The precedence relation may be used to resolve conflicts between the conditions or instructions of multiple policies that apply to the same object. For example, account policies 124 may take precedence over data policies 126, and data policies 126 may take precedence over object policies 128. If there is a conflict between two policies, e.g., because the two policies specify different conditions, the conflict may be resolved in favor of the policy having the higher precedence, e.g., by selecting the condition specified by the policy having higher precedence.

A workflow can be created, approved, and run in respective design, approval, and runtime phases of the workflow system. In the design phase, users can define objects and associated access policies. Certain aspects, such as access policies that specify how data and applications can be used, can be common to different types of objects, such as data and applications. To enable a workflow to access a particular dataset, a user designing a workflow can create a data object in the workflow for the dataset, provide access information for the dataset (e.g., a URL), and specify a data policy that constrains access to the dataset. The data policy can specify a specific application or workflow that has permission to access the dataset. The data policy can have usage constraints. For example, permission can be granted to a specific user account, and permission can be one-time, number of uses, or during a period of time. A dataset provider or owner can provide credentials that can be obtained by applications of other accounts according to the data policy. An application can use the credentials to access the dataset. For example, a dataset provider can enroll their infrastructure with the CCM 140, e.g., by running a node agent process on at least one of their nodes and enrolling the node in the CCM 140. The CCM 140 can communicate securely with the node(s) of the dataset provider using secure attribute communication techniques, in which information to be communicated between the node (e.g., via the node agent process) of the dataset provider and the CCM 140 can be represented as attributes of the dataset provider's network service. Thus, a provider of a dataset can share the dataset with other users, but access to the dataset by other users is constrained by the data policy associated with the dataset and the credentials needed to access the dataset. The dataset provider can approve specific workflows to access the dataset. To add an application to a workflow, a user designing the workflow can define an application object 114 and specify an application policy that constrains access to the application. For example, the policy constraints for the data policy described above can also apply to the application. Workflows can be defined via a user interface or programmatically via an API. More information on secure communication of attributes of network services may be found in U.S. patent application Ser. No. 16/241,771, filed 7 Jan. 2019, which is incorporated by reference.

A workflow can enter an approval phase, in which an approval mechanism can be used to establish that the workflow is ready to be executed. The approval phase can use quorum approval techniques. A workflow can be approved as a whole, e.g., the workflow, including the objects it includes, may be reviewed in the approval phase, and a threshold number of approvers can be required to approve the entire workflow before it can be executed. To obtain quorum approval to execute a workflow object 112 (or other operation), the workflow system 102 can send an approval request to a quorum approval system. The quorum approval system may be included in the CCM, for example.

The quorum approval system may receive the request from the workflow system to execute the workflow object. The workflow object may be assigned to one or more entities (i.e., a group of entities) that correspond to a user or application that has the ability to approve operations being performed with workflow objects assigned to the particular entities. The entities may each have an associated identifier and contact information stored in a data structure at the quorum approval system that may be utilized by the quorum approval system to acquire approval for operations.

Upon receiving the request to perform the operation, the quorum approval system may identify a quorum policy for the workflow object 112 based on the group assigned to the workflow object 112. The quorum policy may identify particular operations, such as executing the workflow object, that require quorum approval by the entities of the group before performance of the operation is initiated or completed. The quorum approval may correspond to a minimum number of approvals that are to be received from the entities of the group before the operation is performed. For example, if a group includes three entities that approve operations, then quorum approval for the operation may be received when approval from two out of the three entities has been received.

If the quorum approval system determines that the requested operation requires quorum approval based on the quorum policy, then the quorum approval system may transmit an indication to the workflow system 102 that quorum approval is required before the operation is performed. The indication may identify a number of entities in the group that need to approve the operation before the operation is performed. In embodiments, the indication may include a prompt for the workflow system to submit an approval request to the quorum approval system.

In embodiments, upon receiving the approval request from the workflow system 102, the quorum approval system may transmit a request for approval to the entities of the group. The request for approval may include transmitting a notification, such as an email or text message, that notifies entities that an approval is pending. The notification may be transmitted to a device associated with the approving entity using the contact information of the entity stored in a data structure at the quorum approval system. For example, the quorum approval system 102 may transmit an email to the approving entities of a group by identifying email addresses of the approving entities for a group in the data structure.

The quorum approval system may provide a user interface to the approving entities. The user interface may be a graphical user interface (GUI) that shows the pending approvals for a particular entity. The GUI may provide information associated with each of the pending approvals. For example, for each pending approval, the GUI may identify a type of the requested operation (e.g., execute a workflow), an identification of the entity requesting the operation, the object (e.g., workflow object) the operation is to be performed on, and the approval status of the approving entities. The GUI may include one or more selectable icons that allow an approving entity to either approve or reject the requested operation. In some embodiments, another GUI may be provided to a user of the workflow system 102 requesting the performance of the operation. Such a GUI may identify whether particular entities have approved or rejected the performance of the operation.

The quorum approval system may determine whether a number of received approvals from the approving entities satisfy the quorum policy. For example, if a quorum policy of a workflow object 112 requires two out of three approving entities to approve an operation on the cryptographic item, then the quorum policy is satisfied when two approving entities have approved the operation. If the number of received approvals satisfies the quorum policy, then the workflow system 102 may perform the requested operation. For example, if the requested operation is to execute a workflow object, then the workflow system may execute a workflow as specified by the workflow object 112. Otherwise, if the number of received approvals does not satisfy the quorum policy, then the workflow system may not perform the requested operation. More information on quorum approval may be found in U.S. patent application Ser. No. 16/228,651 filed 12 Dec. 2018, which is incorporated by reference.

The workflow user interfaces 130 can include a workflow composition user interface, which can generate a workflow object 112 based on a graphical representation of the workflow object 112 composed by a user. A workflow approval user interface can present a workflow, e.g., a graphical representation of the workflow object 112, to one or more users for approval. If a sufficient number of users approve the workflow, it can be made available for execution. The workflow system 102 can execute an application on a processing device, such as a compute node of the environment 100, by obtaining a workflow object 112 that specifies one or more application objects 114 to be executed and one or more data objects 106 to be processed by the application objects 114. The workflow system 102 can cause the program code of applications represented by each of the application object 114 to execute within a secure enclave associated with a processing device such as a compute node. The workflow system 102 can obtain an application configuration associated with the application object 114. The application configuration can include data access information for the one or more data objects 114. The workflow system 102 can determine, for each of the data objects 106, whether the application object 114 and user executing the workflow have permission to access the data objects 106 according to a data policy 126 associated with the data object 106. Responsive to determining, for each of the data objects 106, that the application object 114 and user have permission to access the data object 106 according to the data policy 126, the workflow system can obtain access credentials for the data object 106 using the data access information specified in the application configuration for the data object 106. The workflow system can then execute the application program code in the secure enclave, and the application program code can access the data objects 106 using the access credentials.

Figure 2:
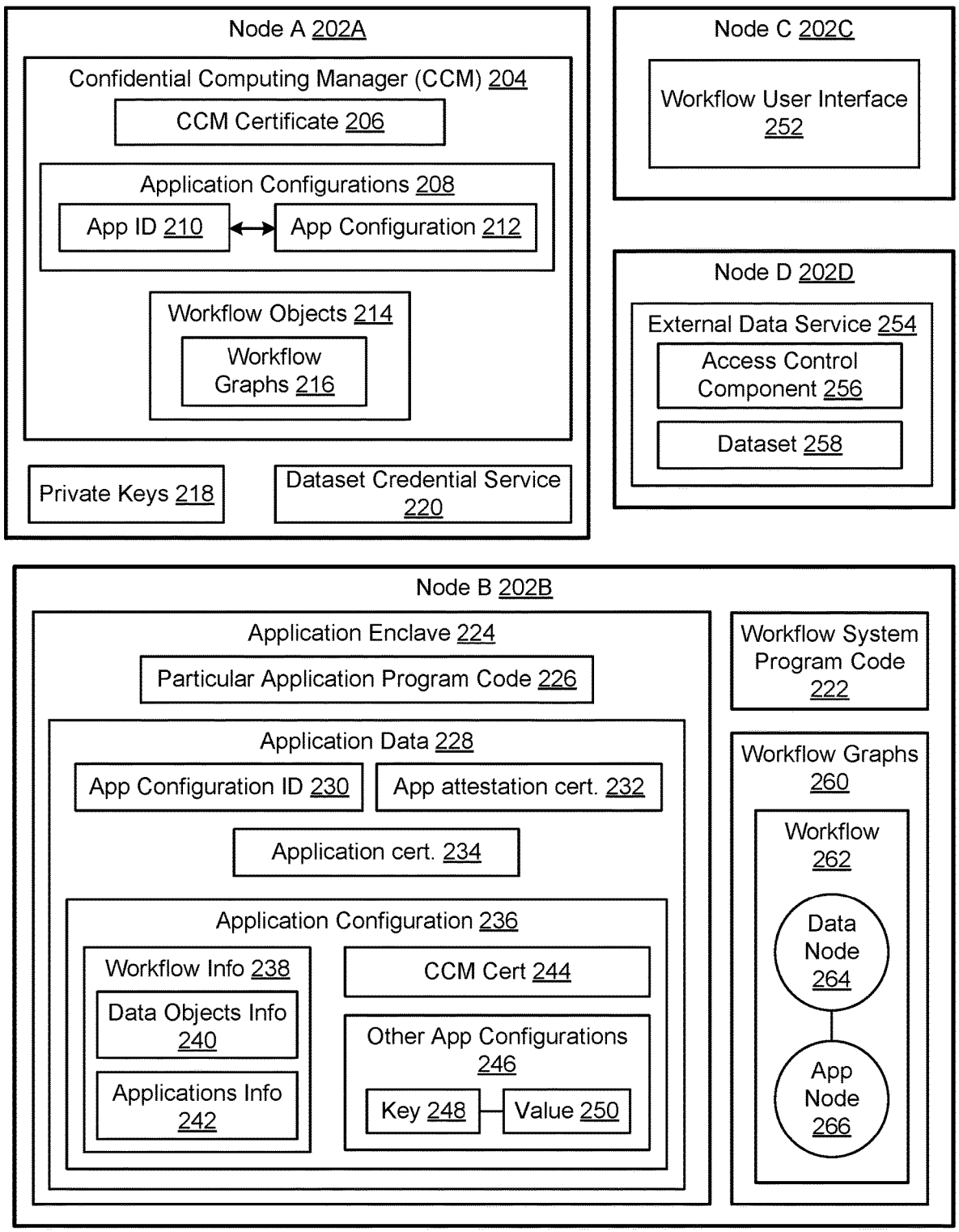
FIG. 2 illustrates an example environment including nodes having data structures and program code representing confidential computing workflows in accordance with particular embodiments of the present disclosure.

FIG. 2 illustrates an example environment including nodes 202 having data structures and program code representing confidential computing workflows in accordance with particular embodiments of the present disclosure. The nodes 202, which may be hosted in a data center, include Node A 202A, Node B 202B, Node C 202C, and Node D 202D. The nodes 202 may communicate with each other via a communication network or other form of data transfer. Node A 202A may host a Confidential Computing Manager (CCM) 204, which may be implemented as one or more server processes that can process requests from other nodes 202 to retrieve or store information. Information stored and provided to other nodes 202 may include a CCM certificate 206, which may be a self-signed certificate generated by the CCM 204, application configurations 208, and workflow objects 214. Node A 202 may also store private keys 218, which may be used, for example, to sign digital certificates such as the CCM certificate 206. Node A 202 may also host a dataset credential service 202, which may provide credentials (e.g., cryptographic keys) that can be used to access information stored in other services, such as data 258 stored in an external data service 254 on Node D 202D.

The application configurations 208 may include a set of application identifiers (IDs), each of which may be associated with an application configuration 236. Each application configuration 236 may represent configuration information of a particular application identified by the associated application ID 210. Application configurations 236 may be provided to workflow system components located on other nodes, such as workflow system program code 222 located on Node B 202B. The information contained in application configurations 236 is described below with respect to Node B 202B, which hosts an example application that uses an application configuration 236. Node B 202B may receive the application configuration 236 from the CCM 204 on Node A 202A.

The CCM 204 may store workflow objects 214 that represent workflows and can be executed by the workflow system (e.g., by workflow system program code 222). Each of the workflow object may include the account objects, data objects, and workflow entity objects used by a workflow object 214. A workflow object 214 may be represented as one or more workflow graphs 216 or other suitable data structure. For example, a workflow graph 216 may include a graph node that represents each application node in a workflow object, and a data node that represents each data object in the workflow object. The graph 216 may include an edge between an application node and each data node the application node accesses (e.g., there may be a data node connected to the application node by an edge for each input data object and output data object of the application node). There can also be an edge between an application node 266 and another application node 266 to denote a secure channel (e.g., Transport Layer Security (TLS)-based communication) between the corresponding applications. Furthermore, an application node 266 can be connected to a data node 264 (e.g., which may correspond to an output dataset generated by the application) by an edge. A data node 264 that represents an input dataset can be connected to an application node 266 by an edge. That is, a data object 264, and the dataset represented by the data object 264, can act as both input to an application and output from an application. Other types of objects, such as workflow entity objects, may also be represented as graph nodes. Information related to the objects may also be stored as attributes of the graph nodes.

Node B 202B may include workflow system program code 222, which may implement at least a portion of the workflow system. Node B 202B may further include an application enclave 224 in which program code and data can be securely stored and attested, e.g., so that unauthorized changes to the program code or data at runtime can be detected. The application enclave 224 may include application program code 226 of a particular application. The application program code 226 may implement the particular application. The application enclave 224 may also include application data 228, which may be associated with an application object that represents the particular application. The application data 228 may include an application configuration ID, an application attestation certificate, and an application certificate, which are described below with respect to FIG. 5B.

The application data 228 may also include an application configuration 236, which may be received from the CCM 204, for example. The application configuration 236 may include workflow information 238, which may include data objects info 240 and other applications info 242. The data objects info 240 may correspond to one or more data objects accessed by the application. The data objects info 240 may specify how the data represented by a data object may be accessed, such as a URL of a data service from which the data can be requested and received. The data represented by a data object may be referred to herein as a "dataset." A dataset may reside in a data service such as the external data service 254, which hosts a dataset 258. To access a dataset, the workflow system may provide authentication credentials to the data service and receive the data, e.g., via streaming, downloading, querying, or other suitable form of data transfer. The dataset and/or the received data may be associated with a data object through which the received data can be accessed. The applications info 242 in an application configuration may specify how to establish secure communication with other applications, e.g., with applications in other workflows. The applications info 242 may include, for example, identifiers of other applications and, for each of the other applications, an identifier of a workflow object that contains the other application.

Each application configuration 244 may further include a CCM certificate, which may be a copy of the CCM certificate 206 described above, and other application configurations 246. The other application configurations 246 may include a key-value map in which each key 248 is associated with a value 250. The key-value map may represent additional configuration to be passed to the particular application, which may interpret the configurations. Thus, an application may use the other application configuration 246 to derive how to access datasets and communicate with other applications securely. The other application configuration 246 may also be used to change the behavior of the particular application. For example, the particular application may communicate with external services via ports configured via the other application configurations 246. This application configuration mechanism enables configuration parameters to be securely communicated to the particular application at runtime without altering the enclave cryptographic hash value calculated for the contents of the application enclave 224.

Node B may also include workflow graphs 260, which may be used by the workflow system program code to identify data objects and entity objects that are associated with a workflow or with other data objects or entity objects. The workflow graphs 260 located on Node B 202B may be copies of at least a portion of the workflow objects 214 stored by the CCM 204 located on Node A 202A. As an example, the input data objects to an application in a workflow object may be identified by querying the workflow graph 262 that corresponds to the workflow object for the application node 266 that represents the application, then querying the workflow graph 262 for each data node 262 that is connected to the application node 266 by an edge that represents an input data connection.

Node 202C may host a workflow user interface 252, which may be, for example, a workflow composition user interface that can be used to compose workflows, a workflow approval user interface that can be used to approve workflows (e.g., using quorum approval), and a workflow execution user interface that can be used to execute workflows, or a combination of those. To execute a workflow on a node other than Node C 202C, the workflow user interfaces may communicate with the workflow system program code 222 located on other nodes on which the workflow is to be executed, such as Node B 202B.

Node D 202D may host an external data service 254, which may provide access to a dataset 258. The external data service 254 may be located on a node that is not in the same data center or other environment as the nodes on which workflows execute. Further, the external data service 254 does not necessarily trust the nodes on which the workflows execute. Thus, the external data service 254 may include an access control component 256, which may require authentication prior to accessing the dataset 258.

Figure 3:
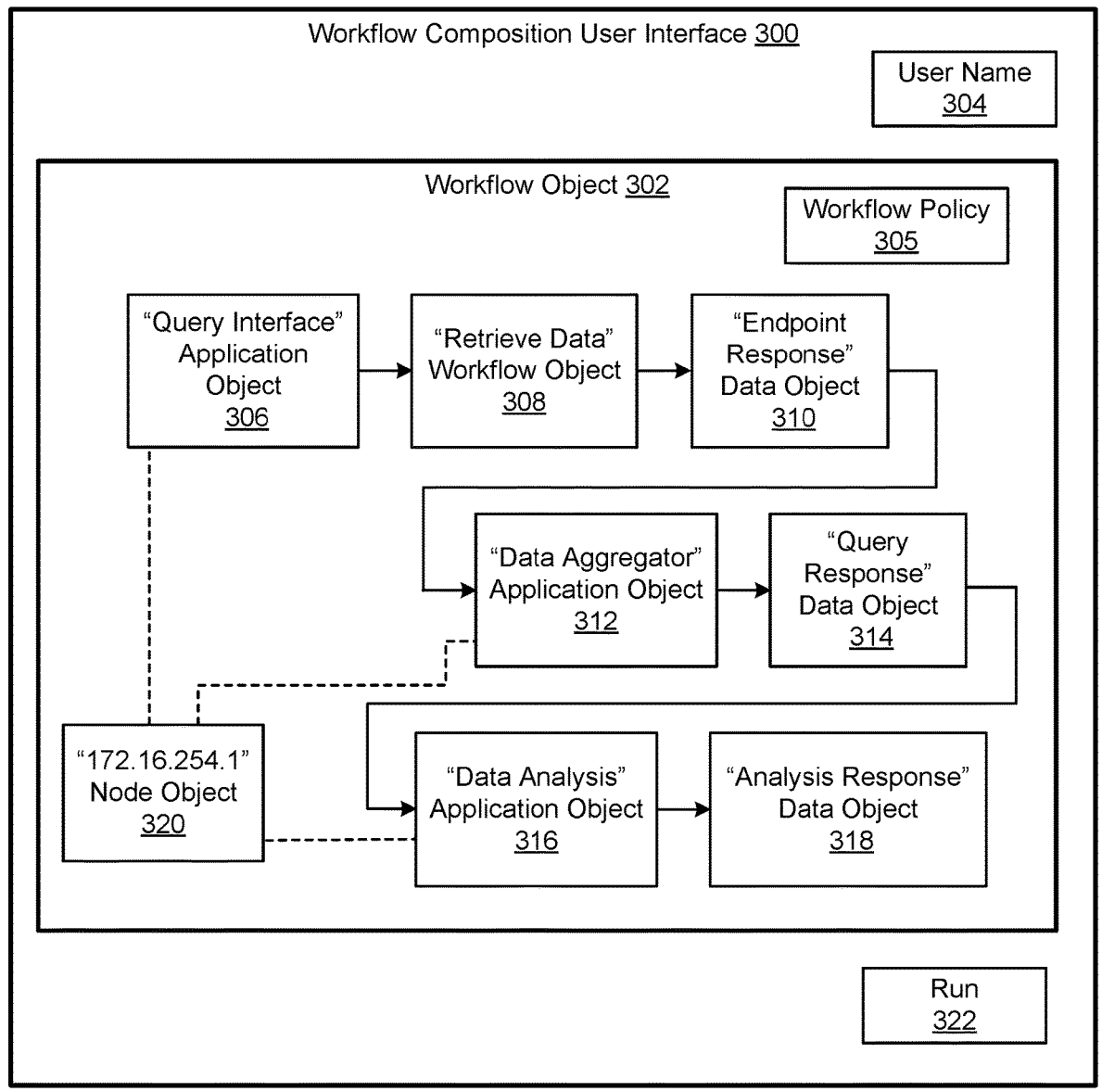
FIG. 3 illustrates an example workflow composition user interface depicting an example workflow in accordance with particular embodiments of the present disclosure.

FIG. 3 illustrates an example workflow composition user interface 300 depicting an example workflow 302 in accordance with particular embodiments of the present disclosure. The workflow composition user interface 300 may be presented on a computing device by the workflow system, for example. A user may compose workflows by interacting with the workflow composition user interface 300. The workflow composition user interface may display a user name 304, which may identify the user who is using the user interface, and a workflow object 302, which may represent a workflow that is being composed or has previously been composed. The workflow object 302 is presented as a diagram that depicts a workflow policy 305 associated with the workflow and a set of objects that form the workflow. Each object can have a name and a type. The objects are connected by arrows that indicate the direction of execution of the workflow. The first object to be executed when the workflow is executed is a "Query Interface" application object 306, which may execute an application that performs a query operation on a data store or other data source. The application object 306 is connected to a "Retrieve Data" workflow object 308, which is the next object in sequence to be performed. The workflow object 308 may invoke a specified workflow, e.g., a workflow that retrieves data, as a nested workflow of the workflow object 302. The workflow object 308 is connected to an "Endpoint Response" data object 310, which represents endpoint response data. The connection from the workflow object 308 to the "Endpoint Response" data object 310 indicates that the "Endpoint Response" data object 310 is output generated by the workflow object 308. The "Endpoint Response" data object 310 is connected to a "Data Aggregator" application object 312, which may execute an application that performs data aggregation using at least the "Endpoint Response" data object as input. The connection from the "Endpoint Response" data object 310 to the application object 312 indicates that the "Endpoint Response" data object is input data provided to the application object 312.

The "Data Aggregator" application object 312 is connected to a "Query Response" data object 314, which represents query response data. The connection from the application object 312 to the "Query Response" data object 314 indicates that the "Query Response" data object 314 is output generated by the application object 312. The "Query Response" data object 314 is connected to a "Data Analysis" application object 316, which may execute an application that performs data analysis on input data that corresponds to the "Query Response" data object 314 and generates output data that corresponds to the "Analysis Response" data object 318.

A node object 320 named "172.16.254.1" represents a compute node on which each application object connected to the node object 320 is to be executed. In this example, since the "Query Interface" application object 306, the "Data Aggregator" application object 312, and the "Data Analysis" application object 316 are connected to the node object 312, as shown by the dashed lines, the applications represented by the application objects 306, 312, 316 are executed on the node represented by the node object 320. The node in this example is a network server having the Internet Protocol (IP) address 172.16.254.1. The workflow composition user interface 300 also includes a "Run" button 322 that, if selected by user input, causes the workflow object 302 to be executed. Execution of the workflow object 302 causes the "Query Interface" application object 306, the "Retrieve Data" nested workflow object 308, the "Data Aggregator" application object 312, and the "Data Analysis" application object 316 to be executed in that order. Execution of each object may cause the corresponding nested workflow or application to be executed.

Execution of the workflow object 302 may conform to the workflow policy 305 associated with the workflow object 302. For example, if the workflow policy 305 specifies tan expiry date beyond which the workflow object 302 cannot be executed, then attempts to execute the workflow object 302 after the expiry date may not result in execution of the workflow object 302.

Figure 4:
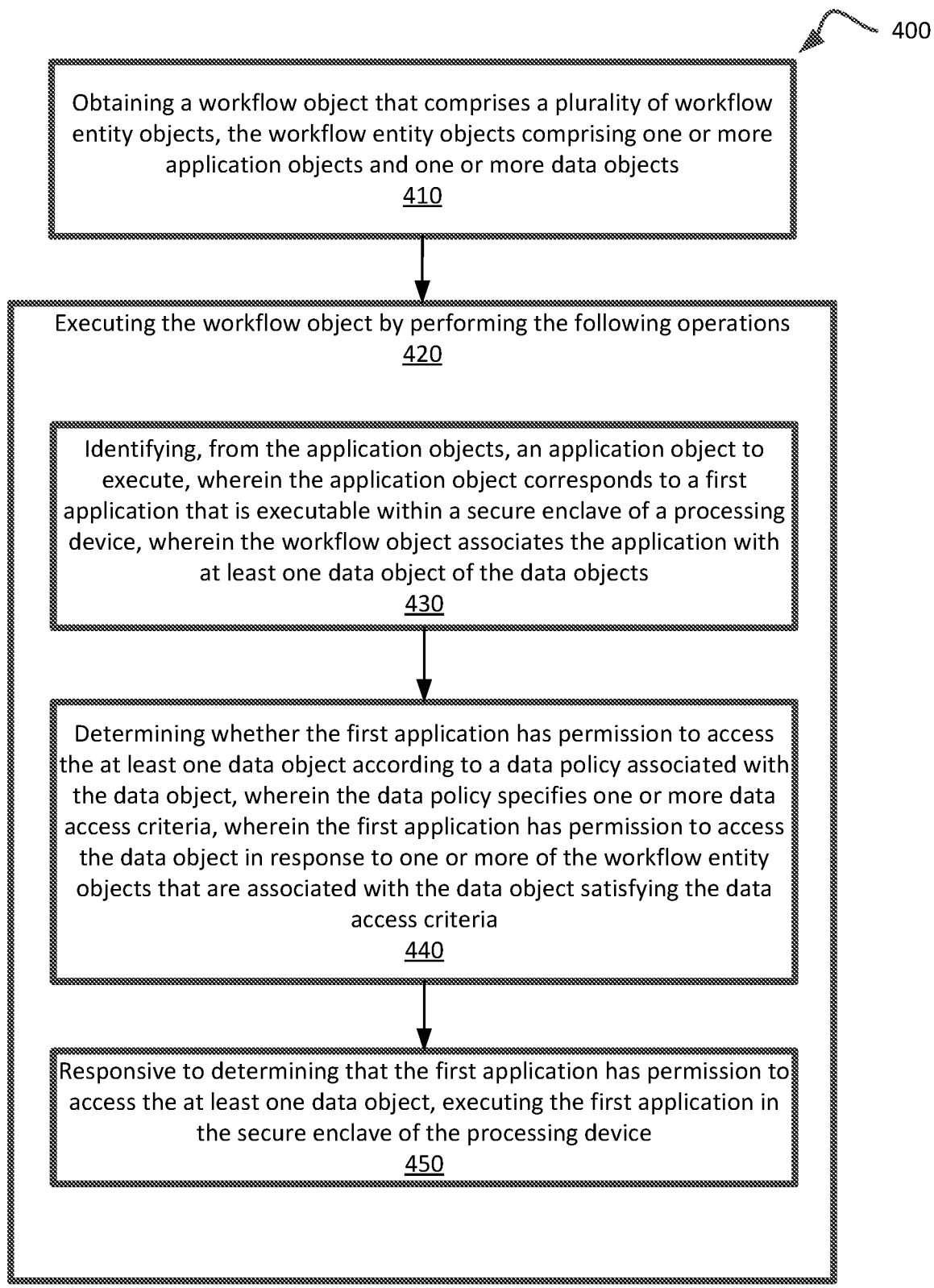
FIGS. 4 and 5A are flow diagrams of example methods to access secure data from workflow applications in accordance with particular embodiments of the present disclosure.

FIG. 4 is a flow diagram of an example method 400 to access secure data from workflow applications in accordance with particular embodiments of the present disclosure. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 400 may be performed by the workflow system 102 of FIG. 1.

As shown in FIG. 4, the method 400 may begin with processing logic obtaining, by a processing device, a workflow object that comprises a plurality of workflow entity objects, the workflow entity objects comprising one or more application objects and one or more data objects (block 410). The processing logic may subsequently execute the workflow object by performing the operations in block 420, which include the operations of blocks 430, 440, and 450. The processing logic may further identify, from the application objects, an application object to execute, wherein the application object corresponds to a first application that is executable within a secure enclave of a processing device, wherein the workflow object associates the application with at least one data object of the data objects (block 430). The processing logic may further determine whether the first application has permission to access the at least one data object according to a data policy associated with the data object, wherein the data policy specifies one or more data access criteria, wherein the first application has permission to access the data object in response to one or more of the workflow entity objects that are associated with the data object satisfying the data access criteria (block 440). The processing logic may further, responsive to determining that the first application has permission to access the at least one data object, execute the first application in the secure enclave of the processing device (block 450).

Figure 5A:
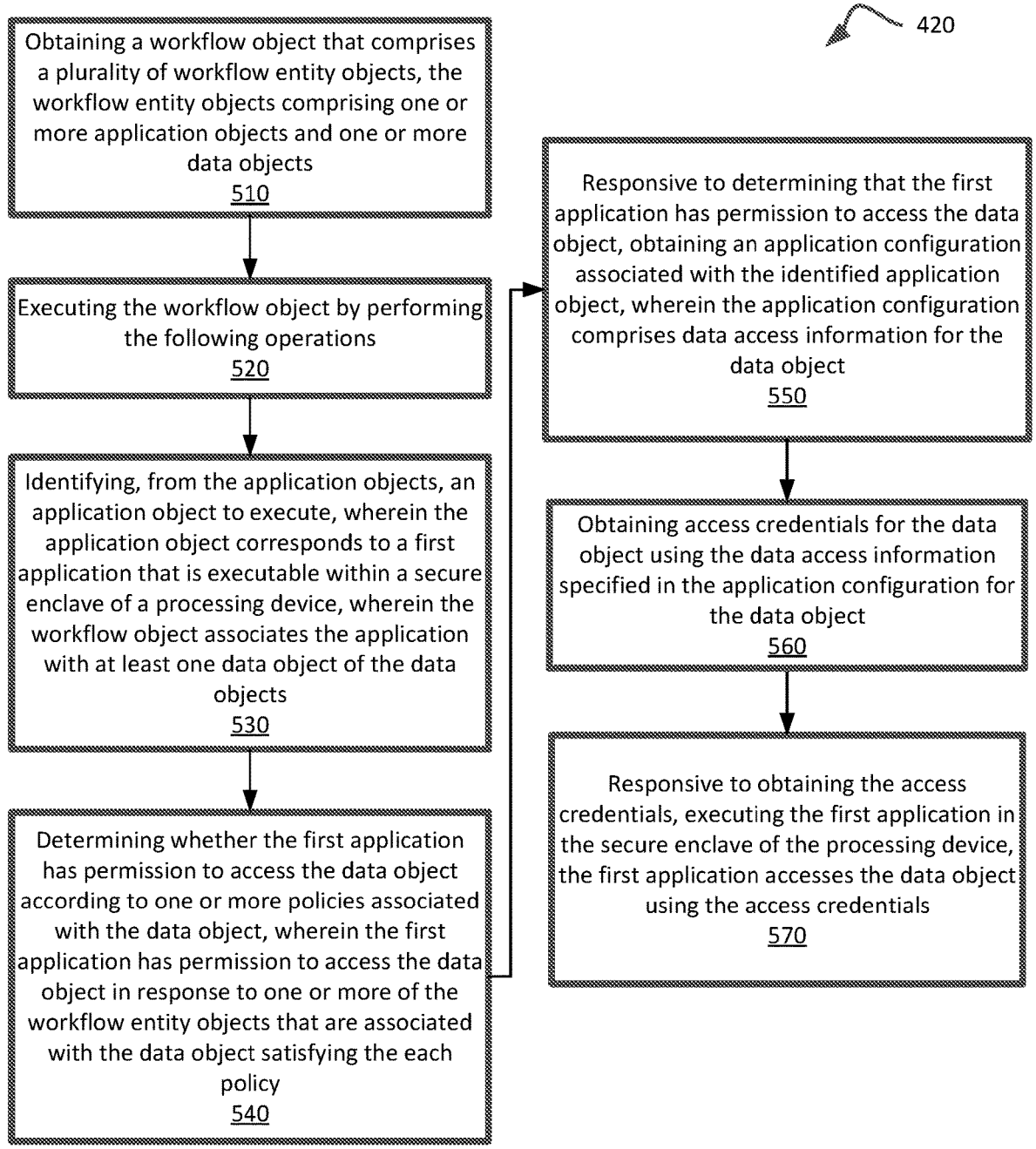

FIG. 5A is a flow diagram of an example method 500 to access secure data from workflow applications in accordance with particular embodiments of the present disclosure. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 500 may be performed by the workflow system 102 of FIG. 1.

As shown in FIG. 5A the method 500 may begin with processing logic obtaining a workflow object that comprises a plurality of workflow entity objects, the workflow entity objects comprising one or more application objects and one or more data objects (block 510). The processing logic may subsequently execute the workflow object by performing the operations of blocks 530-570 (block 520). The processing logic may further identify, from the application objects, an application object to execute, wherein the application object corresponds to a first application that is executable within a secure enclave of a processing device, wherein the workflow object associates the application with at least one data object of the data objects (block 530).

The processing logic may further determine whether the first application has permission to access the data object according to one or more policies associated with the data object, wherein the first application has permission to access the data object in response to one or more of the workflow entity objects that are associated with the data object satisfying each policy (block 540). The processing logic may further, responsive to determining that the first application has permission to access the data object, obtain an application configuration associated with the identified application object, wherein the application configuration comprises data access information for the data object (block 550). The processing logic may further obtain access credentials for the data object using the data access information specified in the application configuration for the data object (block 560). The processing logic may further, responsive to obtaining the access credentials, execute the first application in the secure enclave of the processing device, the first application accesses the data object using the access credentials (block 570).

Figure 5B:
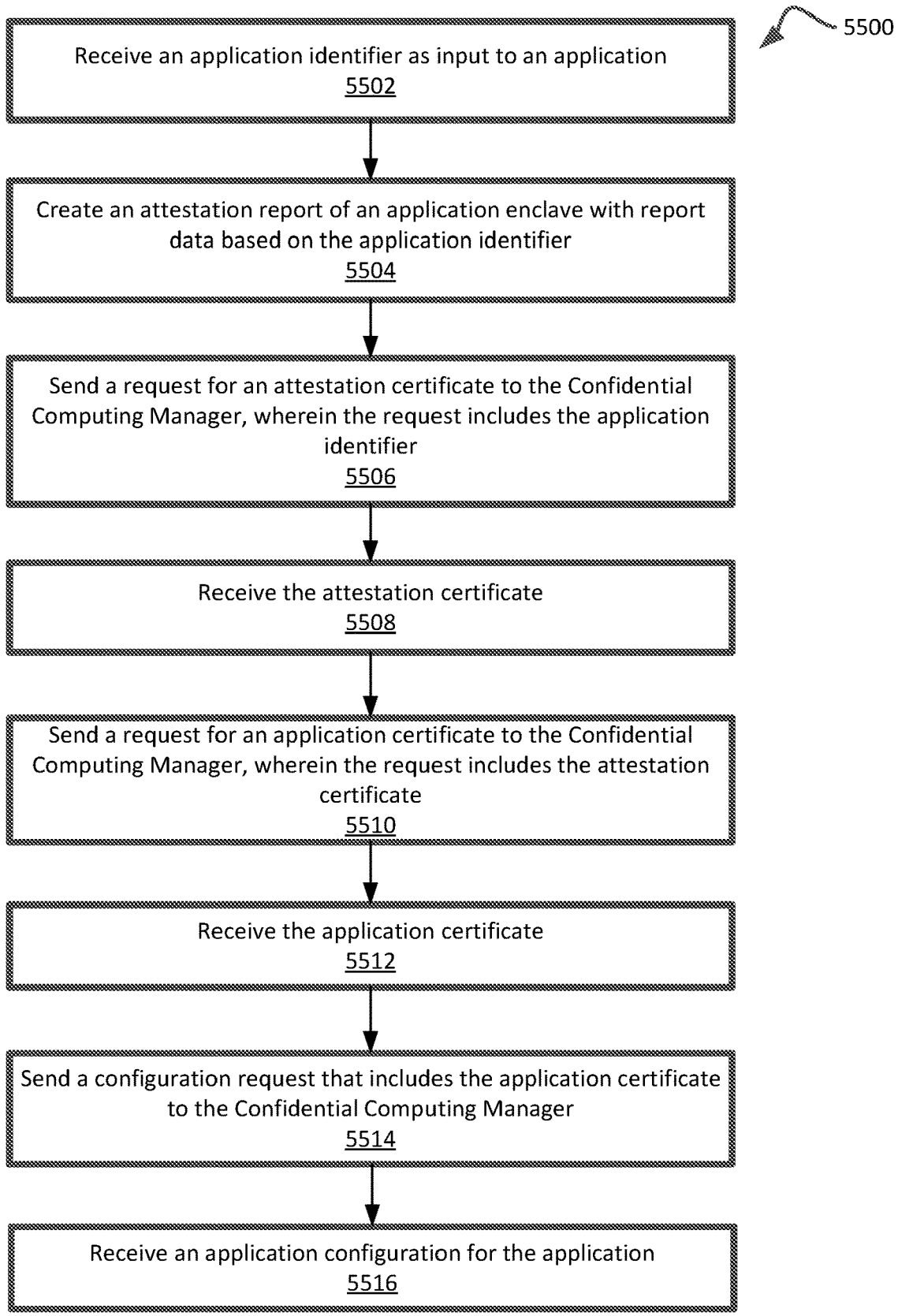
FIG. 5B is a flow diagram of an example method to obtain an application configuration in accordance with particular embodiments of the present disclosure.

FIG. 5B is a flow diagram of an example method 5500 to obtain an application configuration in accordance with particular embodiments of the present disclosure. The method 5500 may correspond to block 550 of the method 500, for example. In general, the method 5500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 5500 may be performed by the workflow system 102 of FIG. 1.

As shown in FIG. 5B, the method 5500 may begin with processing logic receiving an application identifier as input to an application (block 5502). The method 5500 may be invoked at block 550 of the method 500, or in response to a request to execute an application object. A user may have specified the application identifier to the Confidential Computing Manager (CCM) 204, e.g., via a user interface. The processing logic may subsequently create an attestation report of an application enclave with report data based on the application identifier (block 5504). The processing logic may further send a request (e.g., a Certificate Signing Request (CSR)) for an attestation certificate to the CCM, wherein the request includes the application identifier (block 5506). The request for an attestation certificate may be sent to a node agent process located on the same node as the portion of the workflow system 102 that is performing the method 5500, for example. The node agent process may forward the request to the CCM, and also receive a response from the CCM and forward the response to the processing logic. The processing logic may further receive the attestation certificate (block 5508).

The processing logic may further send a request for an application certificate to the CCM, wherein the request includes the attestation certificate (block 5510). The processing logic may send the request for an application certificate to the node agent process as described above for the attestation certificate request. The CCM may verify that the application is permitted to access the configuration. If the application is permitted to access the configuration, the CCM may send an application certificate for the application to the application. The processing logic may further receive the application certificate from the CCM (block 5512). The processing logic may further send a configuration request that includes the application certificate to the CCM (block 5514). The CCM may authenticate the certificate (e.g., verify the certificate with a private key of the CCM). If the CCM successfully authenticates the certificate, the CCM may extract the application identifier from the certificate, identify the application configuration corresponding to the application identifier, and send the identified application configuration to the application. The processing logic may further receive the application configuration for the application (block 5516). The CCM may provide a hash of the configuration, in which case the application may calculate a hash of the configuration and verify that the calculated hash matches the hash provided by the CCM. If the hashes match, the application may proceed to use the application configuration to execute.

Figure 5C:
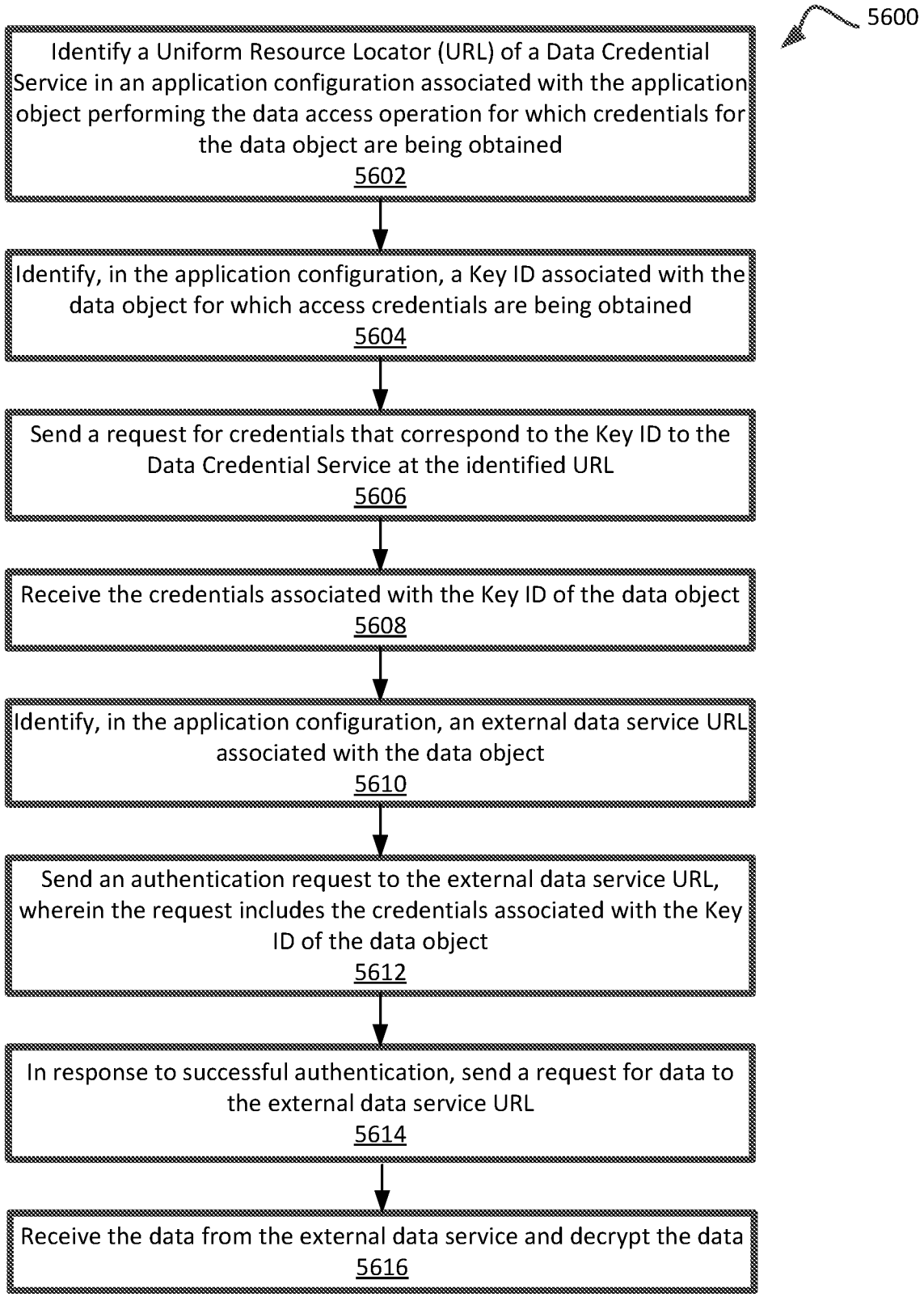
FIG. 5C is a flow diagram of an example method to obtain secure data from a data source in accordance with particular embodiments of the present disclosure.

FIG. 5C is a flow diagram of an example method 5600 to obtain secure data from a data source in accordance with particular embodiments of the present disclosure. The method 5600 may correspond to block 560 of the method 500, for example. In general, the method 5600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 5600 may be performed by the workflow system 102 of FIG. 1.

As shown in FIG. 5C, the method 5600 may begin with processing logic identifying a Uniform Resource Locator (URL) of a Data Credential Service in an application configuration associated with the application object performing the data access operation for which credentials for the data object are being obtained (block 5602). The processing logic may subsequently identify, in the application configuration, a Key ID associated with the data object for which access credentials are being obtained (block 5204). The processing logic may further send a request for credentials that correspond to the Key ID to the Data Credential Service at the identified URL (block 5606). The processing logic may further receive the credentials associated with the Key ID of the data object (block 5608). The processing logic may further identify, in the application configuration, an external data service URL associated with the data object (block 5610). The processing logic may further send an authentication request to the external data service URL, wherein the request includes the credentials associated with the Key ID of the data object (block 5612). The processing logic may further, in response to successful authentication, send a request for data to the external data service URL (block 5614). The processing logic may further receive the data from the external data service and decrypt the data (block 5616).

Figure 6:
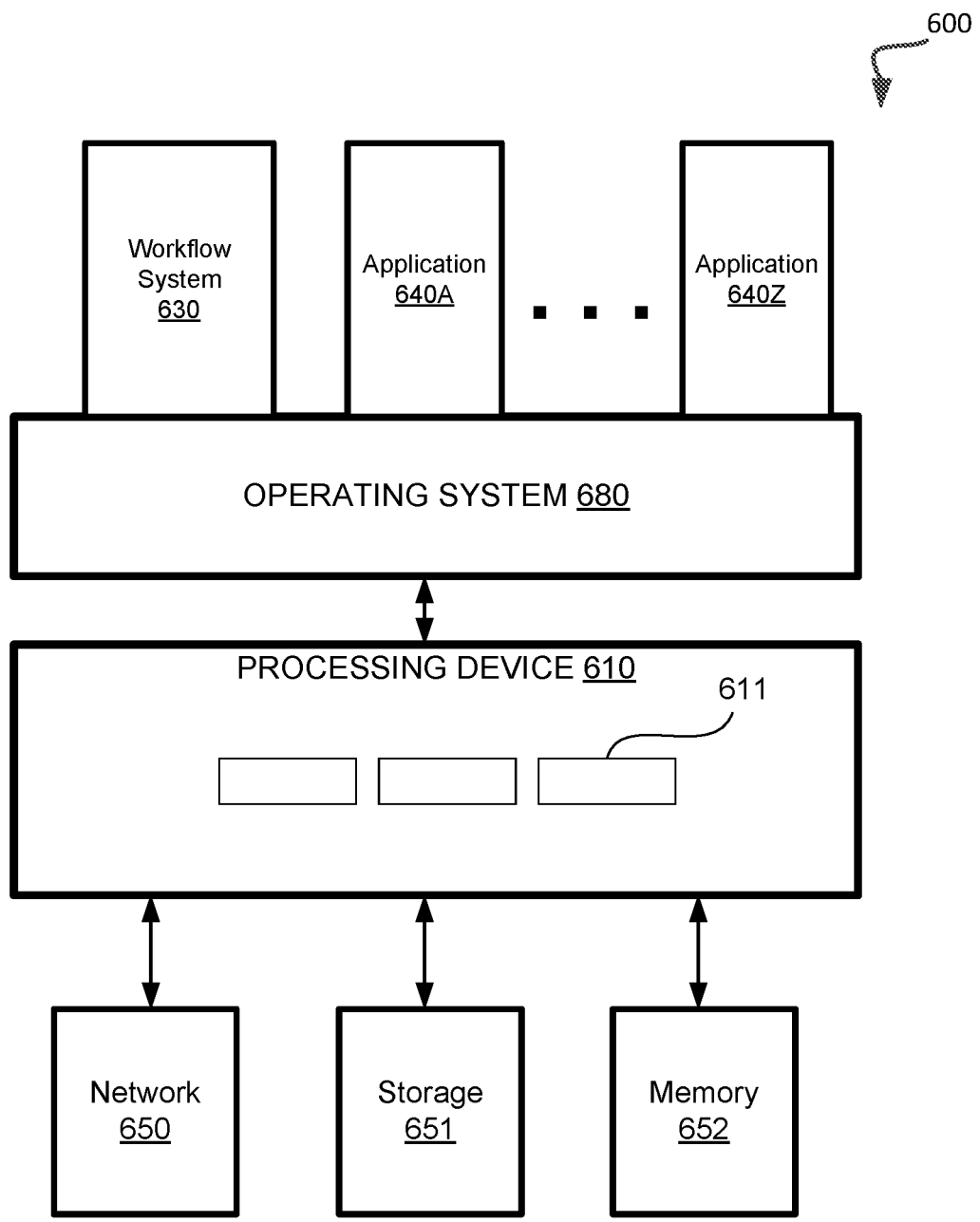
FIG. 6 illustrates an example network server with a workflow system to execute a workflow in accordance with particular embodiments of the present disclosure.

FIG. 6 illustrates an example network server 600 with a workflow system 630 to execute a workflow in accordance with particular embodiments of the present disclosure. In general, a workflow system 630 may be hosted by a network server along with one or more other applications 640A to 640Z that are also hosted by the network server or another network server. The workflow system 630 may correspond to the workflow system 102 of FIG. 1.

As shown in FIG. 6, the network server 600 may include a processing device 610 that may execute an operating system 620. Furthermore, the processing device 610 may include one or more internal cryptographic keys 611 that may be used to encrypt and decrypt data stored in a portion of a memory that is assigned to a secure enclave of the workflow system 630 and/or each application 640A to 640Z. The access to the data of the workflow system 630 and/or application 640A in the secure enclave may be protected from the one or more other applications 640B to 640Z and the operating system 620. For example, the access to the data of the secure enclave corresponding to workflow system 630 and/or application 640A may be protected by the use of one of the internal cryptographic keys 611 that are internal to the processing device 610 so that the access to the data is based on a hardware access as opposed to a software access. The operating system 620 may be associated with a first privilege level and the workflow system 630 and the applications 640A to 640Z may be associated with a second privilege level where the first privilege level of the operating system is more privileged than the second privilege level of the various applications that are run on the operating system 620 (e.g., the more privileged level allows access to more resources of the network server than the less privileged level). Thus, the operating system 620 may be allowed access to resources of the applications 640B to 640Z. However, since the workflow system 630 is assigned to a secure enclave where access to the data of the secure enclave is based on the use of an internal cryptographic key 611 of the processing device 611, the operating system 620 may not be able to access the data of the workflow system 630 and/or application 640A despite having a more privileged level of access than the workflow system 630. In operation, the workflow system 630 may be hosted on the network server 600.

Figure 7:
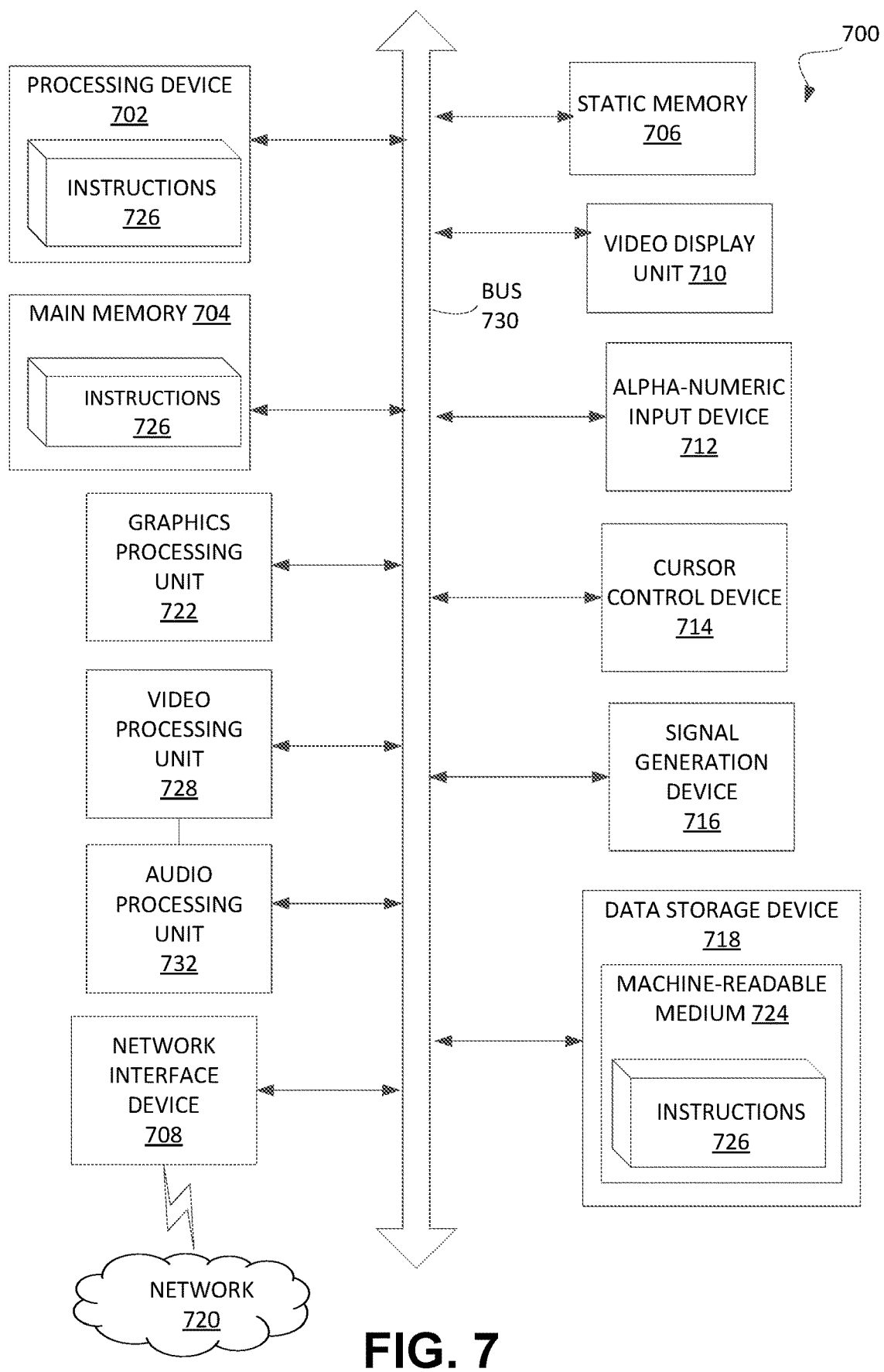
FIG. 7 illustrates an example computer system in which embodiments of the present disclosure operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to a geo-fencing enclave manager. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   obtaining, by a processing device, a workflow object that comprises a plurality of workflow entity objects, the workflow entity objects comprising one or more application objects and one or more data objects; and
   executing, by the processing device, the workflow object, wherein executing the workflow object comprises:
      identifying, from the application objects, an application object to execute, wherein the application object corresponds to a first application that is executable within a secure enclave of the processing device, wherein the workflow object associates the application with at least one data object of the data objects;
      determining whether the first application has permission to access the at least one data object according to a data policy associated with the at least one data object, wherein the data policy specifies one or more data access criteria, and wherein the first application has permission to access the at least one data object in response to one or more of the workflow entity objects that are associated with the at least one data object satisfying the data access criteria; and
      responsive to determining that the first application has permission to access the at least one data object, executing the first application in the secure enclave of the processing device,
   wherein the workflow entity objects are configured to further comprise one or more of the following: a node object that represents a compute node hosted by an account, a key object that represents a cryptographic key, a user object that represents a user who is authorized to access the data in the account, a device object that represents a computing device, wherein the computing device is authorized to access the data in the account, or a workflow object that represents a workflow, wherein the workflow comprises at least one of the following: a data object, an application object, a node object, a key object, a user object, a device object, or another workflow object.

2. The method of claim 1, wherein executing the workflow object further comprises: obtaining an application configuration associated with the identified application object, wherein the application configuration comprises data access information for the at least one data object; and obtaining access credentials for the at least one data object using the data access information specified in the application configuration for the at least one data object, wherein the first application accesses the at least one data object using the access credentials.

3. The method of claim 2, wherein obtaining access credentials for the at least one data object is further responsive to obtaining quorum approval from a group of users for a current user object to access the at least one data object.

4. The method of claim 1, wherein the data access criteria comprise a set of permitted objects that are permitted to access the data, and the application has permission to access the at least one data object at least in response to one or more of the workflow entity objects that are associated with the at least one data object being in the set of permitted objects.

5. The method of claim 1, wherein the data policy associated with the at least one data object specifies a set of user objects that have permission to access the data object, and obtaining access credentials for the data object is further responsive to a current user object associated with execution of the workflow corresponding to one of the user objects in the set.

6. The method of claim 1, wherein the data policy associated with the at least one data object comprises an access permission indicator specifying whether one or more other objects have permission to access the data object, wherein the other objects comprise application objects, and determining, for each of the data objects, whether the first application has permission to access the data object is based on whether the access permission indicator indicates that the application objects have permission to access the data object.

7. The method of claim 6, wherein the other objects comprise at least one workflow object, and obtaining access credentials for the data object is further responsive to determining, for each of the data objects, whether the access permission indicator indicates that the workflow objects have permission to access the data object.

8. The method of claim 1, wherein the data objects provide access to data associated with the account, wherein the account is of a computing environment, and access to the data is via the account, wherein the account is associated with an account policy, and conflicts between the account policy and the data policy are resolved in favor of the account policy.

9. The method of claim 1, wherein the workflow entity objects further comprise at least one user object that represents an individual user who is authorized to access the data associated with the account, wherein the user object is associated with a user policy that specifies a set of permissions the individual user has, wherein the permissions comprise one or more of a configure application permission, an execute application permission, a configure workflow permission, an execute workflow permission, or a manage key permission.

10. The method of claim 1, wherein the workflow entity objects further comprise at least one node object that represents a compute node, wherein the node object is associated with a node policy that specifies a resource constraint for the compute node, wherein execution of applications on the compute node satisfies the maximum utilization.

11. The method of claim 1, wherein the workflow entity objects further comprise at least one cryptographic key object that represents a cryptographic key, wherein the node object is associated with a cryptographic policy that specifies one or more of a key type, key size, or key permissions, wherein the cryptographic key satisfies one or more of the key type, key size, or key permissions.

12. The method of claim 2, wherein the application configuration further comprises a certificate signed by a confidential computing manager, the certificate for authenticating one or more second applications.

13. The method of claim 1, wherein the application object is associated with an application policy, the method further comprising: determining whether the application object is permitted to execute according to the application policy, wherein executing the first application is responsive to determining that the application object is permitted to execute according to the application policy.

14. The method of claim 1, wherein the application object is associated with an application policy that specifies a set of permitted data objects that the first application is permitted to access, wherein the first application has permission to access the data object in response to the data object being in the set of permitted data objects.

15. The method of claim 14, wherein the application policy further specifies a set of compute nodes on which the first application is permitted to execute, and the processing device on which the application is executed corresponds to a compute node in the specified set of compute nodes.

16. The method of claim 14, wherein the application policy further specifies one or more execution parameters, and executing the first application in the secure enclave of the compute node is in accordance with the execution parameters.

17. A system comprising:
a memory; and
a processing device, operatively coupled with the memory, to:
obtain a workflow object that comprises a plurality of workflow entity objects, the workflow entity objects comprising one or more application objects and one or more data objects; and
execute the workflow object, wherein to execute the workflow object, the processing device is further to:
identify, from the application objects, an application object to execute, wherein the application object corresponds to a first application that is executable within a secure enclave of the processing device, wherein the workflow object associates the application with at least one data object of the data objects;
determine whether the first application has permission to access the at least one data object according to a data policy associated with the at least one data object, wherein the data policy specifies one or more data access criteria, and wherein the first application has permission to access the at least one data object in response to one or more of the workflow entity objects that are associated with the at least one data object satisfying the data access criteria; and
responsive to determining that the first application has permission to access the at least one data object, execute the first application in the secure enclave of the processing device,
wherein the workflow entity objects are configured to further comprise one or more of the following: a node object that represents a compute node hosted by an account, a key object that represents a cryptographic key, a user object that represents a user who is authorized to access the data in the account, a device object that represents a computing device, wherein the computing device is authorized to access the data in the account, or a workflow object that represents a workflow, wherein the workflow comprises at least one of the following: a data object, an application object, a node object, a key object, a user object, a device object, or another workflow object.

18. The system of claim 17, wherein to execute the workflow object, the processing device is further to: obtain an application configuration associated with the identified application object, wherein the application configuration comprises data access information for the at least one data object; and obtain access credentials for the at least one data object using the data access information specified in the application configuration for the at least one data object, wherein the first application accesses the at least one data object using the access credentials.

19. A non-transitory computer readable medium comprising data that, when accessed by a processing device, cause the processing device to:

obtain a workflow object that comprises a plurality of workflow entity objects, the workflow entity objects comprising one or more application objects and one or more data objects; and execute the workflow object, wherein to execute the workflow object, the processing device is further to:
identify, from the application objects, an application object to execute, wherein the application object corresponds to a first application that is executable within a secure enclave of the processing device, wherein the workflow object associates the application with at least one data object of the data objects;
determine whether the first application has permission to access the at least one data object according to a data policy associated with the at least one data object, wherein the data policy specifies one or more data access criteria, and wherein the first application has permission to access the at least one data object in response to one or more of the workflow entity objects that are associated with the at least one data object satisfying the data access criteria; and
responsive to determining that the first application has permission to access the at least one data object, execute the first application in the secure enclave of the processing device, wherein the workflow entity objects are configured to further comprise one or more of the following: a node object that represents a compute node hosted by an account, a key object that represents a cryptographic key, a user object that represents a user who is authorized to access the data in the account, a device object that represents a computing device, wherein the computing device is authorized to access the data in the account, or a workflow object that represents a workflow, wherein the workflow comprises at least one of the following: a data object, an application object, a node object, a key object, a user object, a device object, or another workflow object.

* * * * *